US008370094B2

(12) United States Patent
Komatsu

(10) Patent No.: US 8,370,094 B2
(45) Date of Patent: Feb. 5, 2013

(54) DETECTING DEVICE FOR FUEL INJECTOR

(75) Inventor: Kou Komatsu, Chiryu (JP)

(73) Assignee: Denso Corporation, Kariya (JP)

( * ) Notice: Subject to any disclaimer, the term of this patent is extended or adjusted under 35 U.S.C. 154(b) by 309 days.

(21) Appl. No.: 12/796,890

(22) Filed: Jun. 9, 2010

(65) Prior Publication Data

US 2010/0312501 A1 Dec. 9, 2010

(30) Foreign Application Priority Data

Jun. 9, 2009 (JP) ................................ 2009-138440

(51) Int. Cl.
*G06F 19/00* (2011.01)
*F02M 51/00* (2006.01)

(52) U.S. Cl. ........................................ 702/64; 123/490

(58) Field of Classification Search .................... 702/64, 702/50; 60/274, 276; 123/480, 492, 490
See application file for complete search history.

(56) References Cited

U.S. PATENT DOCUMENTS 5,492,101 A * 2/1996 Saito et al. .................... 123/491
2009/0056677 A1 3/2009 Nakata et al.

FOREIGN PATENT DOCUMENTS

JP 11-36954 2/1999
JP 2002-243694 8/2002

OTHER PUBLICATIONS

U.S. Appl. No. 12/817,266, Yamada et al, filed Jun. 17, 2010.
U.S. Appl. No. 12/814,777, Sugiyama et al, filed Jun. 14, 2010.
U.S. Appl. No. 12/813,731, Yamada, filed Jun. 11, 2010.
U.S. Appl. No. 12/797,070, Yoshida, filed Jun. 9, 2010.
U.S. Appl. No. 12/796,904, Sugiyama et al, filed Jun. 9, 2010.
U.S. Appl. No. 12/817,286, Nakata et al, filed Jun. 17, 2010.
U.S. Appl. No. 12/796,845, Takashima, filed Jun. 9, 2010.
Japanese Office Action dated Oct. 4, 2011, issued in corresponding Japanese Application No. 2009-138440 with English Translation.
Office Action (7 pgs.) dated Aug. 3, 2012 issued in corresponding Chinese Application No. 201010198651.8 with an at least partial English-language translation thereof.

* cited by examiner

*Primary Examiner* — Bryan Bui
(74) *Attorney, Agent, or Firm* — Nixon & Vanderhye P.C.

(57) ABSTRACT

A detecting device for a fuel injector includes a sensor unit and an ECU. The sensor unit is provided with a fuel pressure detection circuit which outputs a pressure detection signal in response to a fuel pressure. The ECU computes the fuel pressure based on a voltage value of the pressure detection signal relative to a reference voltage. The ECU obtains a comparative voltage according to an applied-voltage to the fuel pressure detection circuit and computes a deviation between the comparative voltage and the reference voltage. The sensor unit adjusts the applied-voltage in such a manner as to decrease the deviation. Thus, the computation accuracy of the fuel pressure is improved.

19 Claims, 7 Drawing Sheets

DETECTING DEVICE FOR FUEL INJECTOR

CROSS-REFERENCE TO RELATED APPLICATION

This application is based on Japanese Patent Application No. 2009-138440 filed on Jun. 9, 2009, the disclosure of which is incorporated herein by reference.

FIELD OF THE INVENTION

The present invention relates to a detecting device for a fuel injector, which detects fuel pressure or fuel temperature in a fuel injector provided for an internal combustion engine.

BACKGROUND OF THE INVENTION

JP-2009-74536A (US-2009/0056677A1) shows a fuel injection system in which a fuel pressure sensor is disposed on a fuel injector in order to detect fuel pressure. Based on a variation in the fuel pressure, a variation in a fuel injection rate is estimated. Based on this estimated variation in the fuel injection rate, an actual fuel injection start timing and a fuel injection quantity are computed. The pressure sensor has a detection circuit which outputs a detection signal according to the fuel pressure. An electronic control unit (ECU) computes the fuel pressure based on voltage value of the detection signal outputted from the pressure sensor.

However, if an applied-voltage applied to the detection circuit deviates from a reference voltage, a deviation arises in a relationship between the detection signal and the actual fuel pressure, so that the fuel pressure computed by the ECU deviates from the actual fuel pressure.

Also in a case that a fuel temperature is detected by the detection circuit, a deviation between the computed fuel temperature and the actual fuel temperature will arise.

SUMMARY OF THE INVENTION

The present invention is made in view of the above matters, and it is an object of the present invention to provide a detecting device for a fuel injector, which accurately detects a fuel pressure or a fuel temperature in a fuel injector.

According to the present invention, a detecting device for a fuel injector includes a sensor unit and a computing unit (ECU). The sensor unit is provided with a detection circuit which outputs a detection signal in response to a detection physical quantity (fuel pressure or fuel temperature). The ECU computes the fuel pressure or the fuel temperature based on a voltage value of the detection signal relative to a reference voltage. The ECU obtains a comparative voltage according to an applied-voltage applied to the detection circuit and computes a deviation between the comparative voltage and the reference voltage. The sensor unit includes an applied-voltage adjusting means which adjusts the applied-voltage in such a manner that the computed deviation becomes smaller.

Thus, even if the applied-voltage applied to the detection circuit deviates from the original voltage (reference voltage), the applied-voltage is adjusted in such a manner as to make the deviation smaller. It is restricted that the computed fuel pressure or the computed fuel temperature deviates from the actual fuel pressure or the actual fuel temperature. The computation accuracy of the fuel pressure or the fuel temperature can be improved.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Figure 1:
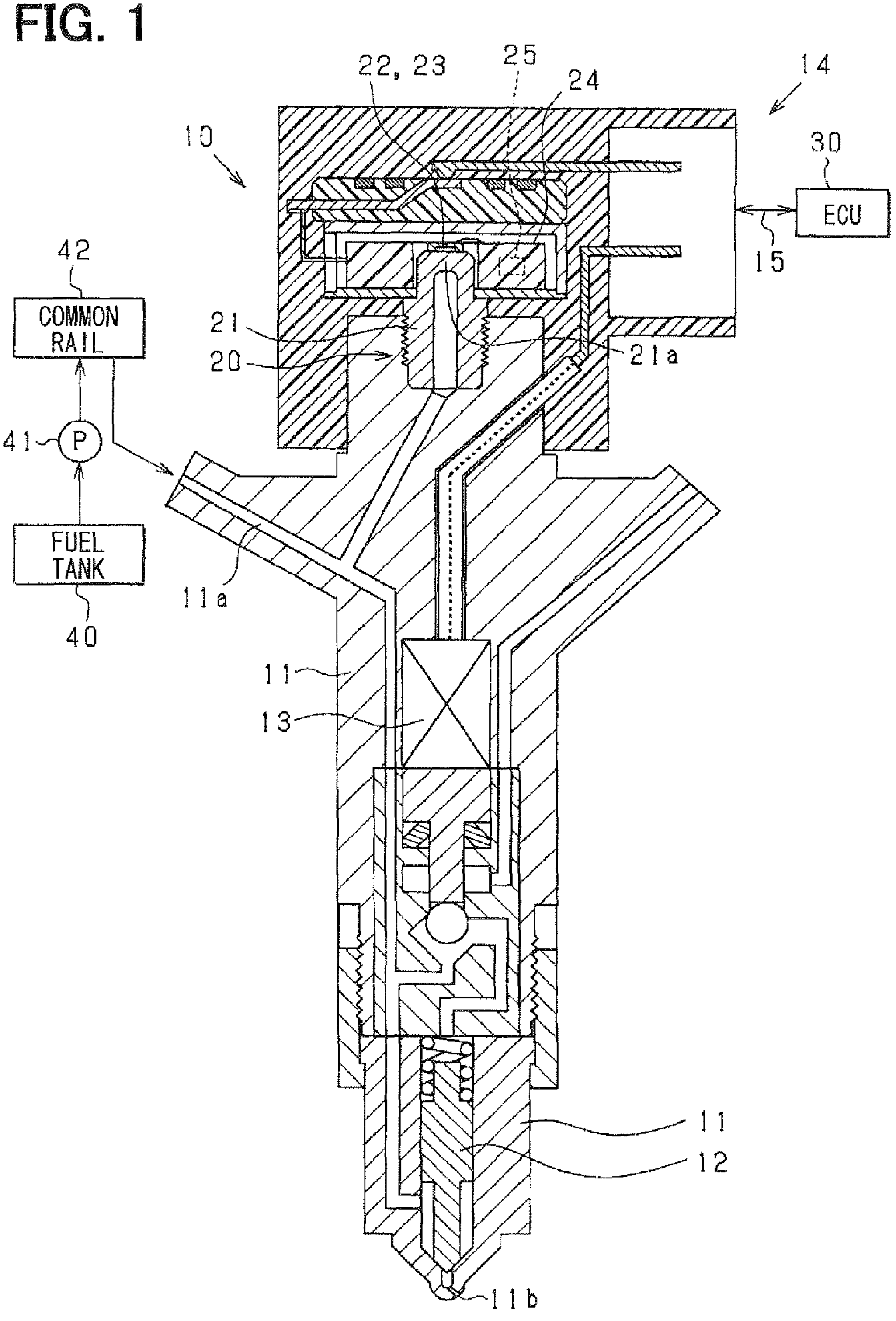
FIG. 1 is a schematic view showing a fuel injection system including a detecting device for a fuel injector according to a first embodiment of the present invention.

Hereafter, embodiments of the present invention will be described. The same parts and components as those in each embodiment are indicated with the same reference numerals and the same descriptions will not be reiterated.

First Embodiment

A sensor system is applied to an internal combustion engine (diesel engine) having four cylinders #1-#4.

FIG. 1 is a schematic view showing a fuel injector 10, a sensor unit 20, an electronic control unit (ECU) 30 and the like.

First, a fuel injection system of the engine including the fuel injector 10 will be explained. A fuel in a fuel tank 40 is pumped up by a high-pressure pump 41 and is accumulated in a common rail 42 to be supplied to each cylinder.

The fuel injector 10 is comprised of a body 11, a needle (valve body) 12, an actuator 13 and the like. The body 11 defines a high pressure passage 11*a* and an injection port 11*b*. The needle 12 is accommodated in the body 11 to open/close the injection port 11*b*. The actuator 13 drives the needle 12.

The ECU 30 controls the actuator 13 to drive the needle 12. When the needle 12 opens the injection port 11*b*, high-pressure fuel in the high pressure passage 11*a* is injected to a combustion chamber (not shown) of the engine. The ECU 30 computes a fuel injection start timing, a fuel injection end timing, a fuel injection quantity and the like based on an engine speed, an engine load and the like. The actuator 13 drives the needle 12 in such a manner as to obtain the above computed value.

A structure of the sensor unit 20 will be described hereinafter. The sensor unit 20 includes a stem (load cell) 21, a fuel pressure detection circuit 22, a fuel temperature detection circuit 23 and a molded IC 24. The stem 21 is provided to the body 11. The stem 21 has a diaphragm 21*a* which elastically deforms in response to high fuel pressure in the high pressure passage 11*a*.

The fuel pressure detection circuit 22 is a bridge circuit comprised of pressure sensitive resistors provided on the diaphragm 21*a*. The resistance value of the pressure sensitive resistors varies in response to a deformation amount of the stem 21, which represents the fuel pressure. The bridge circuit (fuel pressure detection circuit 22) outputs a pressure detection signal depending on the fuel pressure.

The fuel temperature detection circuit 23 is a bridge circuit comprised of temperature sensitive resistors provided on the diaphragm 21*a*. The resistance value of the pressure sensitive resistors varies in response to a temperature of the stem 21, which represents the fuel temperature. The bridge circuit (fuel temperature detection circuit 23) outputs a temperature detection signal depending on the fuel temperature.

Figure 2:
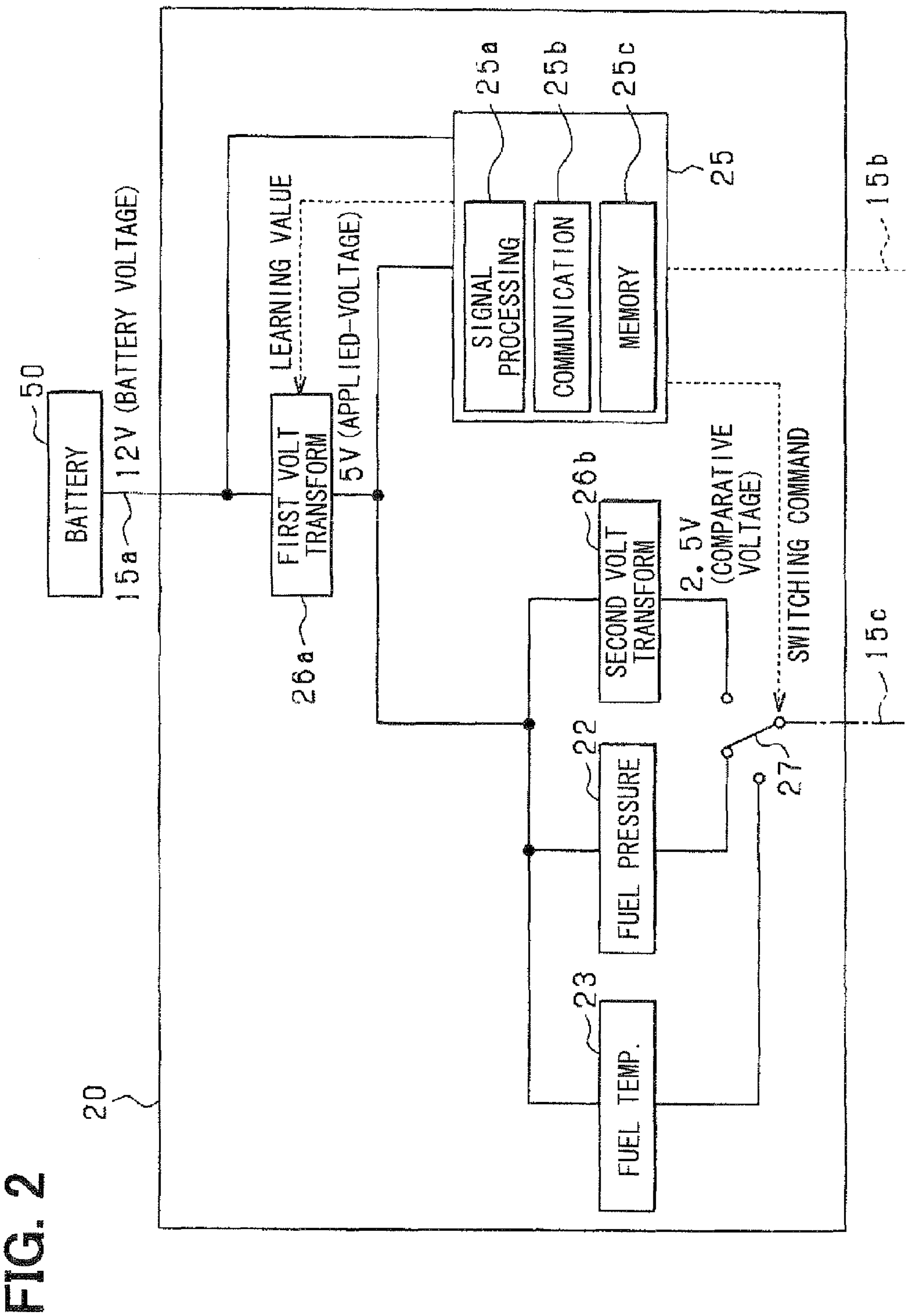
FIG. 2 is a chart showing a circuit configuration of a sensor unit shown in FIG. 1.

As shown in FIG. 2, the molded IC 24 is comprised of an IC-chip 25 having a signal processing circuit 25*a*, a communication circuit 25*b* and a memory 25*c*, a first voltage transform circuit 26*a*, a second voltage transform circuit 26*b*, and a changeover switch 27. A connector 14 is provided on the body 11. The molded IC 24 and the ECU 30 are electrically connected to each other through a harness 15 connected to the connector 14. As shown in FIGS. 2 and 3, the harness 15 includes a power line 15*a* for supplying electricity from a battery 50 to the actuator 13 and the sensor unit 20, a communication line 15*b*, the signal line 15*c*.

FIG. 2 is a chart showing a circuit configuration of the sensor unit 20.

The sensor unit 20 receives electricity from the battery 50. Its voltage is 12V (battery voltage). The voltage of electricity is decreased from 12V to 5V by the first voltage transform circuit 26*a* to be supplied to the fuel pressure detection circuit 22 and the fuel temperature detection circuit 23. That is, an applied-voltage (5V) to the fuel pressure detection circuit 22 and the fuel temperature detection circuit 23 is generated by decreasing the battery voltage (12V) with the first voltage transform circuit 26*a*. The second voltage transform circuit 26*b* further decreases the applied-voltage from 5V to 2.5V. This decreased voltage (2.5V) corresponds to a comparative voltage.

As above, the electrified fuel pressure detection circuit 22 and the electrified fuel temperature detection circuit 23 output the pressure detection signal and the temperature detection signal. The second voltage transform circuit 26*b* outputs the comparative voltage signal. These detection signals and the comparative voltage signal are transmitted to the ECU 30 through the signal line 15*c*. The changeover switch 27 (switching means) selects one of the detection signals and the comparative voltage signal which will be transmitted to the ECU 30 according to a switching command signal transmitted from the IC-chip 25.

It should be noted that a condition where the pressure detection signal or the temperature detection signal is transmitted to the ECU 30 corresponds to "a detection signal output condition", and a condition where the comparative voltage signal is transmitted to the ECU 30 corresponds to "a comparative voltage output condition".

Moreover, the IC-chip 25 receives the applied-voltage (5V) from the first voltage transform circuit 26*a* and the battery voltage (12V) from the battery 50. The signal processing circuit 25*a*, the communication circuit 25*b*, and the memory 25*c* are operated with the applied-voltage (5V). When communicating with the ECU 30, the battery voltage (12V) is required.

Figure 3A:
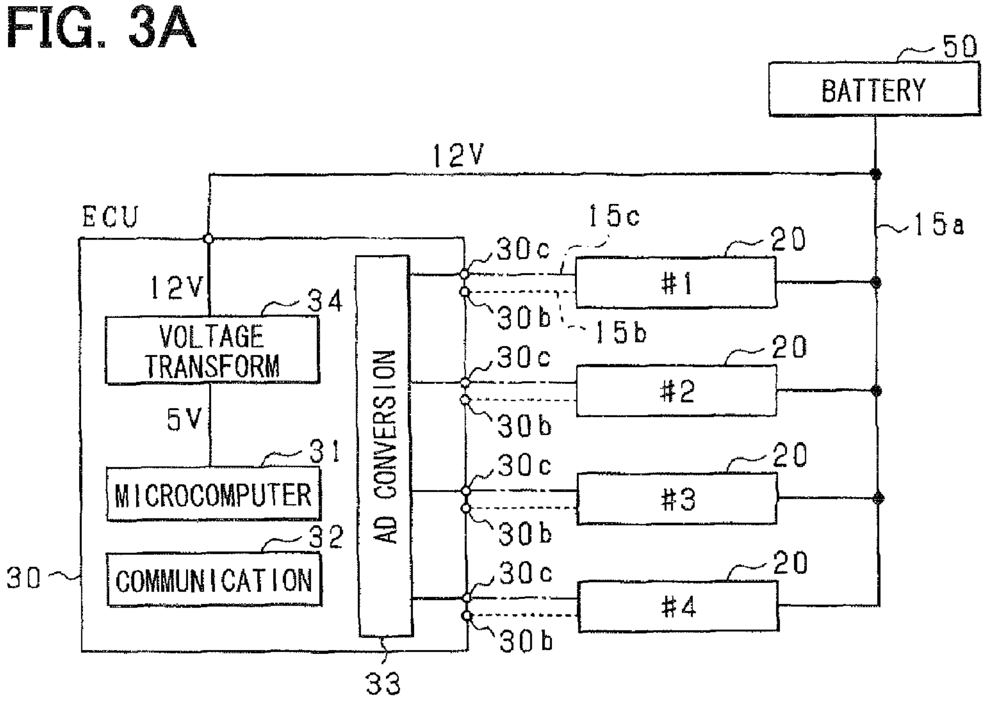
FIGS. 3A and 3B are block diagrams showing a connecting configuration between the sensor units and an ECU.
Figure 3B:
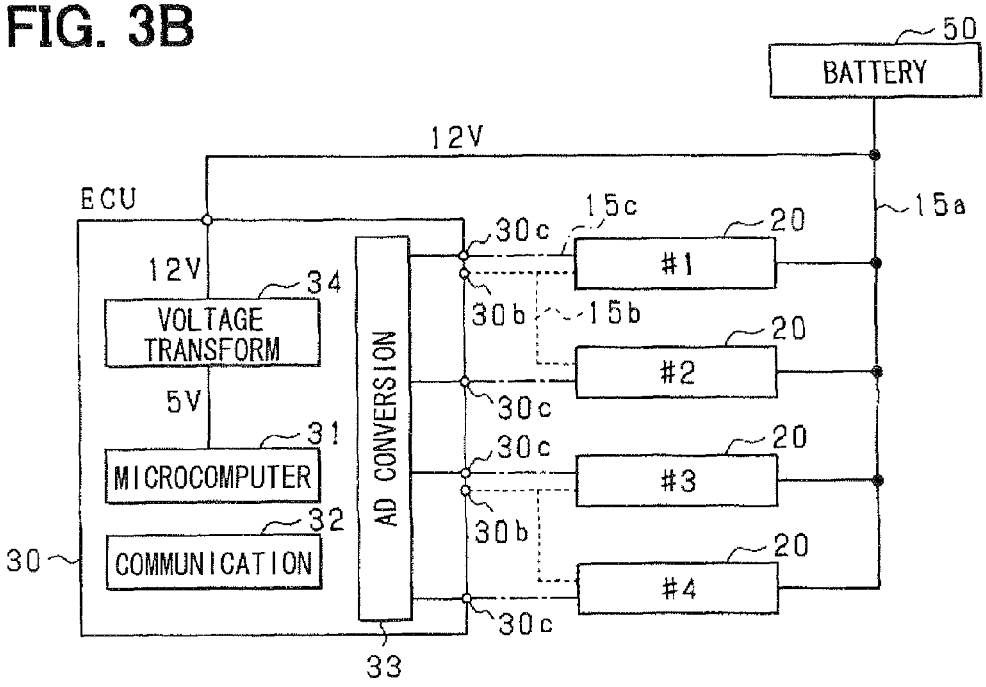

FIG. 3A is a chart showing a circuit configuration of the ECU 30 and showing a connecting configuration of each sensor unit 20 and the ECU 30. The sensor unit 20 is provided to each of four cylinders #1-#4. As shown in FIG. 3A, four sensor units 20 are connected to a single ECU 30. The communication line 15*b* and the signal line 15*a* are connected to each sensor unit 20. Each communication line 15*b* and signal line 15*c* are respectively connected to communication ports 30*b* and signal ports 30*c* of the ECU 30.

The ECU 30 includes a microcomputer 31, an ECU-communication circuit 32, an AD conversion circuit 33, and an ECU-voltage transform circuit 34. The ECU 30 receives electricity from the battery 50. Its voltage is 12V (battery voltage). The voltage of electricity is decreased from 12V to 5V by the ECU-voltage transform circuit 34 to be supplied to the microcomputer 31. This decreased voltage (5V) corresponds to an operation voltage. It should be noted that the ECU-communication circuit 32 is operated with the battery voltage (12V).

The microcomputer 31 selects one of the pressure detection signal, the temperature detection signal and the comparative voltage signal. Based on this selection, the switching command signal is transmitted from the ECU 30 to the IC-chip 25 of the sensor unit 20 through the ECU-communication circuit 32. This switching command signal is a digital signal and is transmitted in a form of a bit string through the communication line 15*b*.

The signal selected by the changeover switch 27 is transmitted to the ECU 30 through the signal line 15*c* and a signal port 30*c* in a form of an analog signal. This analog signal is converted into a digital signal by an A/D converter 33 to be inputted into the microcomputer 31.

At a time when the changeover switch 27 selects the signal based on the switching command signal, a response signal is transmitted from the IC-chip 25 of the sensor unit 20 to the ECU 30. Thereby, since the microcomputer 31 can recognize a switching timing of the detection signal and the comparative voltage signal, the microcomputer 31 can correctly recognize the detection signal among the pressure detection signal, the temperature detection signal, and the comparative voltage signal.

It should be noted that the communication line 15*b* electrically connecting both of the communication circuits 32, 25*b* transmits the switching command signal and the response signal. It is possible to perform a two-way communication through the communication line 15*b*. Meanwhile, the signal line 15*c* can transmit the detection signal in a direction from the sensor unit 20 to the ECU 30.

During a period in which the fuel injector 10 is injecting the fuel, the pressure detection signal is selected and transmitted to the ECU 30. As described later with reference to FIGS. 4A to 4C, a fuel pressure variation waveform is obtained during a fuel injection period so that a variation in a fuel injection rate is estimated. Thus, during a period of fuel injection, it is prohibited that the pressure detection signal is switched to the temperature detection signal or the comparative voltage signal. During a period in which the fuel injector 10 is injecting no fuel, the comparative voltage signal or the temperature detection signal is transmitted to the ECU 30.

As described above, the microcomputer 31 of the ECU 30 can obtain the fuel pressure, the fuel temperature and the reference voltage with respect to each fuel injector 10 mounted on each cylinder #1-#4.

As described above, the pressure detection signal varies depending on the sensor temperature (fuel temperature) as well as the fuel pressure. That is, even if actual fuel pressure is constant, the pressure detection signal varies depending on the sensor temperature. In view of this point, the microcomputer 31 corrects the obtained fuel pressure based on the obtained sensor temperature (fuel temperature) in order to perform a temperature compensation. Furthermore, the microcomputer 31 computes a fuel injection mode representing a fuel injection start timing, a fuel injection period, a fuel injection quantity and the like.

Figure 4A:
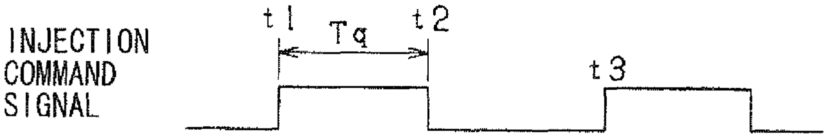
FIG. 4A is a time chart showing an injection command signal transmitted to a fuel injector.
Figure 4B:
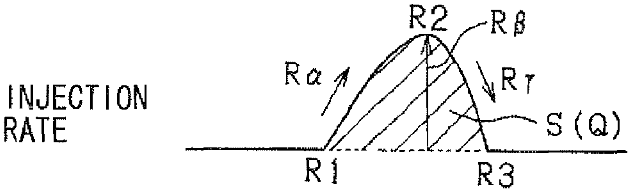
FIG. 4B is a time chart showing a fuel injection rate.
Figure 4C:
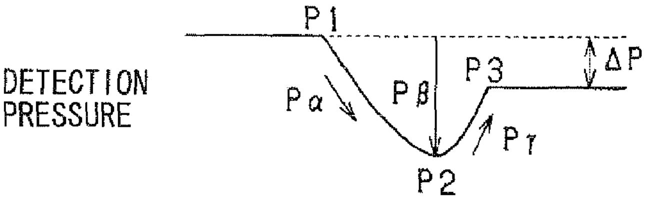
FIG. 4C is a time chart showing a detection pressure detected by a fuel pressure sensor.

Referring to FIGS. 4A-4C, a computation method of the injection mode will be described, hereinafter.

FIG. 4A shows injection command signals which the ECU 30 outputs to the actuator 13. Based on this injection command signal, the actuator 13 operates to open the injection port 11*b*. That is, a fuel injection is started at a pulse-on timing t1 of the injection command signal, and the fuel injection is terminated at a pulse-off timing t2 of the injection command signal. During a time period "Tq" from the timing t1 to the timing t2, the injection port 11*b* is opened. By controlling the time period "Tq", the fuel injection quantity "Q" is controlled.

FIG. 4B shows a variation in fuel injection rate and FIG. 4C shows a variation waveform in detection pressure. Since the variation in the detection pressure and the variation in the injection rate have a relationship described below, a waveform of the injection rate can be estimated based on a waveform of the detection pressure.

That is, as shown in FIG. 4A, after the injection command signal rises at the timing t1, the fuel injection is started and the injection rate starts to increase at a timing R1. When the injection rate starts to increase at the timing R1, the detection pressure starts to decrease at a timing P1. Then, when the injection rate reaches the maximum injection rate at a timing R2, the detection pressure drop is stopped at a timing P2. When the injection rate starts to decrease at a timing R2, the detection pressure starts to increase at a timing P2. Then, when the injection rate becomes zero and the actual fuel injection is terminated at a timing R3, the increase in the detection pressure is stopped at a timing P2.

As described above, by detecting the timings P1 and P3, the injection start timing R1 and the injection terminate timing R3 can be computed. An increasing rate Rα of the injection rate, a decreasing rate Rγ of the injection rate, and the maximum injection rate Rβ can be computed by detecting a decreasing rate Pα of the detection pressure, an increasing rate Pγ of the detection pressure, and a maximum pressure drop amount Pβ of the detection pressure.

Furthermore, a value of integral "S" of the injection rate from the actual fuel-injection start-timing to the actual fuel-injection-end timing (shaded area in FIG. 5B) is equivalent to the injection quantity "Q". An integral value of the detection pressure from the timing P1 to the timing P3 has a correlation with the integral value "S" of the injection rate. Thus, the integral value "S" of the injection rate, which corresponds to the injection quantity "Q", can be computed by computing the integral value of detection pressure.

It should be noted that the applied-voltage to the fuel pressure detection circuit 22 and the fuel temperature detection circuit 23 may deviates from the original voltage (5V). In this case, the relationship between the pressure detection signal and the actual fuel pressure may vary, so that the fuel pressure which the ECU 30 computes deviates from the actual fuel pressure. Similarly, the relationship between the temperature detection signal and the actual fuel temperature may vary, so that the fuel temperature which the ECU 30 computes deviates from the actual fuel temperature.

According to the present embodiment, such a deviation is avoided by executing following control. That is, the operation voltage of the microcomputer 31 is defined as a reference voltage, and a deviation between the comparative voltage and the reference voltage is computed. The first voltage transform circuit 26*a* varies a transform voltage value to adjust the applied-voltage in such a manner that the computed deviation is decreased. Thereby, it can be avoided that the actual applied-voltage deviates from the original applied-voltage (reference voltage).

Figure 5:
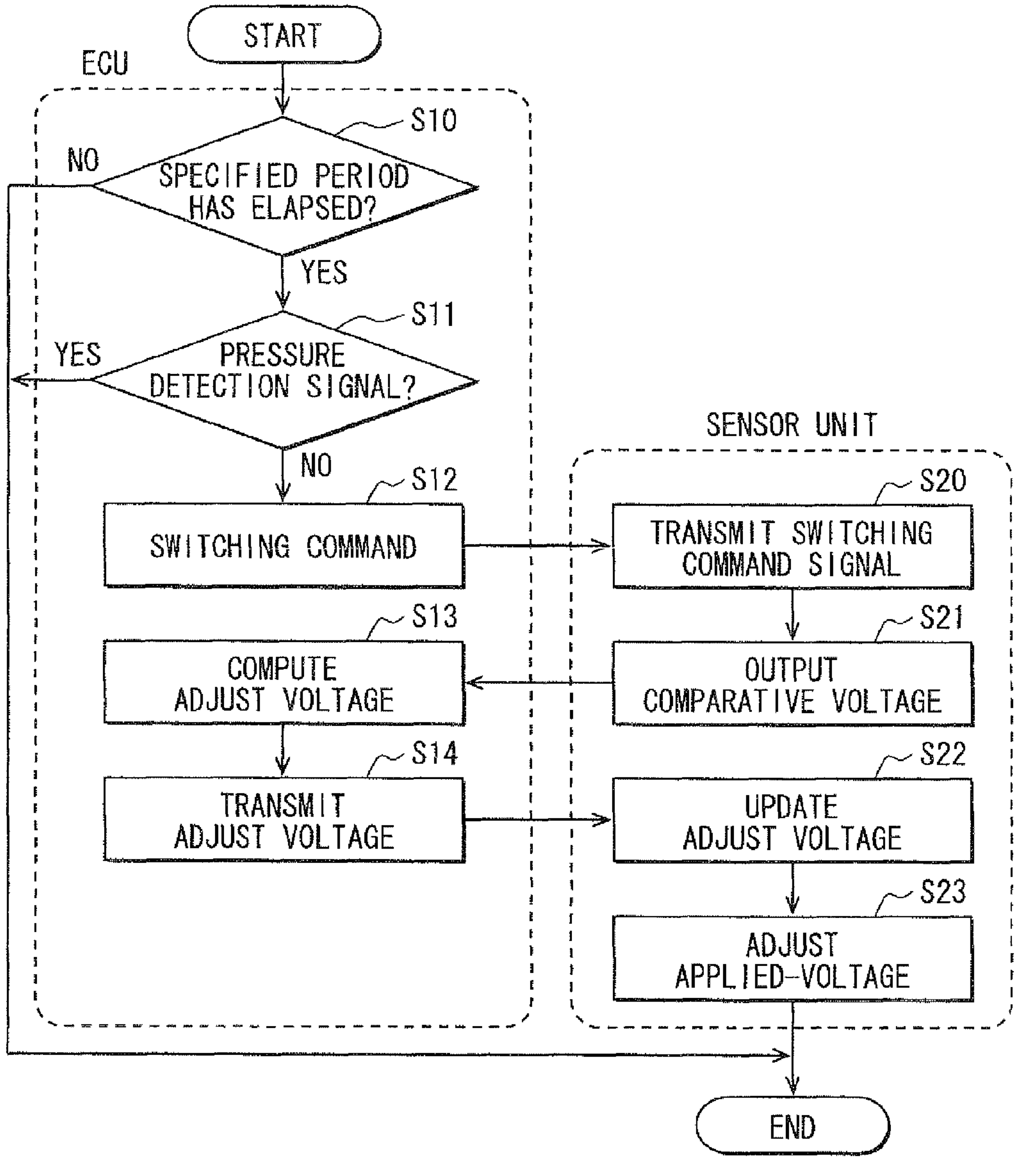
FIG. 5 is a flowchart showing a processing in which an applied-voltage is adjusted by the sensor unit and the ECU, according to the first embodiment.

Referring to FIG. 5, the above control will be described in detail. In step S10, the computer determines whether a specified time period has elapsed after a learning is executed in step S22, which will be described later. When the answer is NO in step S10, the procedure ends. When the answer is YES in step S10, the procedure proceeds to step S11. The subsequent processings will be performed at a regular time interval to reduce a computing load of the microcomputer 31.

In step S11, the computer determines whether a signal transmitted through the signal line 15*c* is the pressure detection signal. That is, the computer determines whether it is a fuel injection period. When the answer is YES in step S11, the procedure ends. When the answer in NO, the procedure proceeds to step S12 in which the switching command signal which commands to output the comparative signal is transmitted to the IC-chip 25 through the communication line 15*b*.

Then, the procedure proceeds to step S20 in which the signal processing circuit 25*a* transmits the switching command signal to the changeover switch 27. In step S21, the changeover switch 27 is switched to connect the second voltage transform circuit 26*a* and the signal line 15*c*. The comparative voltage signal is transmitted to the ECU 30 through the signal line 15*c*.

Then, the microcomputer 31 of the ECU 30 computes an actual applied-voltage based on the transmitted comparative voltage. For example, in a case that the battery voltage (12V) is decreased to the applied-voltage (5V) by the first voltage transform circuit 26*a* and the applied-voltage (5V) is decreased to half (2.5V) by the second voltage transform circuit 26*b*, the ECU 30 can compute the actual applied-voltage by doubling the transmitted the comparative voltage.

Then, the deviation between the computed applied-voltage and the reference voltage is computed, and the applied-voltage is adjusted to make the deviation zero. For example, in a case that the computed applied-voltage is 5.2V and the reference voltage is 5.0V, an adjust voltage is computed as "−0.2V" in step S13. In step S14, the microcomputer 31 transmits signals indicative of the computed adjust voltage and the fuel temperature to the IC-chip 25 through the communication line 15*b*.

It should be noted that the microcomputer 31 corresponds to an obtaining means for obtaining a comparative voltage, a deviation computing means for computing the deviation, and an adjust voltage computing means for computing the adjust voltage, in step S13.

Then, the adjust voltage and the fuel temperature are associated with each other and are stored in the memory 25*c* of the IC-chip 25. For example, a relationship between the adjust voltage and the fuel temperature is stored in a map. The memory 25*c* is a nonvolatile memory (for example, EEPROM etc.). The adjust voltage stored in the memory 25*c* is timely updated as a learning value in step S22.

In step S23, the first voltage transform circuit 26*a* reads the present adjust voltage and adjusts the applied-voltage according thereto. It should be noted that the signal processing circuit 25*a* corresponds to an applied-voltage adjusting means for adjusting the adjust voltage.

According to the present embodiment described above, following advantages can be obtained.

(1) Even if the applied-voltage applied to each detection circuit 22, 23 deviates from the original voltage (reference voltage), the first voltage transform circuit 26*a* adjusts the applied-voltage to make the deviation zero. Thus, a deviation between the detection signals and the actual values can be reduced. It is restricted that the computed fuel pressure and the fuel temperature deviate from the actual fuel pressure and the actual fuel temperature, whereby a computation accuracy of the fuel pressure and the fuel temperature can be improved.

Incidentally, each detection circuit 22, 23 requires a voltage lower than the battery voltage (12V), and the communication circuit 25*b* of the sensor unit 20 requires the battery voltage (12V). Since the ECU 30 and the sensor unit 20 respectively have the voltage transform circuit 34, 26*a*, it is likely that a deviation will arise between the reference voltage generated by the ECU-voltage transform circuit 34 and the applied-voltage generated by the first voltage transform circuit 26*a*.

According to the present embodiment, such deviation can be made zero effectively.

(2) Since the deviation between the reference voltage and the applied-voltage can be reduced or made zero, a variation range of the voltage of the detection signal can be enlarged. Therefore, in performing the A/D conversion of the detection signal by the A/D converter 33 of the ECU 30, the resolution of the digital signal obtained by the ND conversion can be enlarged. Therefore, when the microcomputer 31 computes the fuel pressure or the fuel temperature based on the detection signals, its computation accuracy can be improved.

(3) In each sensor unit 20, since the applied-voltage is adjusted, compared with the common reference voltage, the applied-voltage to each sensor unit 20 can be made to the reference voltage. Therefore, even if the reference voltage deviates from the original voltage, the deviation amount between the reference voltage and the applied-voltage becomes the same among each sensor unit 20. It can be avoided that the detection error of the fuel pressure and the fuel temperature disperses with respect to each sensor unit 20.

(4) The fuel pressure detection circuit 22 has temperature characteristics. The fuel pressure detection signal varies depending on the present fuel temperature even though the actual fuel pressure is constant. On the other hand, in the present embodiment, the adjust voltage and the fuel temperature are stored in the memory 25*c*, and the first voltage transform circuit 26*a* adjusts the applied-voltage based on the adjust voltage corresponding to the present fuel temperature. The applied-voltage is adjusted in response to the temperature characteristic. Thus, the deviation between the reference voltage and the applied-voltage can be accurately reduced, and the computation accuracy of the fuel pressure is more enhanced.

(5) Since the fuel temperature is detected by the fuel temperature detection circuit 23 provided to the fuel injector 10, the temperature at a vicinity of the fuel pressure detection circuit 22 can be detected. Thus, the adjust voltage is determined according to the temperature characteristic with high accuracy, whereby the deviation between the reference voltage and the applied-voltage can be reduced with high accuracy.

(6) The microcomputer 31 of the ECU 30 can not read the signal of which voltage exceeds the operation voltage (for example, 5V). If the applied-voltage is used as the comparative voltage and the applied-voltage is larger than the original value (for example, 5V), the computer can not read the comparative voltage. The deviation between the comparative voltage and the reference voltage can not be accurately computed.

On the other hand, in the present embodiment, the applied-voltage is decreased by the second voltage transform circuit 26*b* to obtain the comparative voltage. Even if the applied-voltage is higher than the reference voltage (5V), it is less likely that the comparative voltage exceeds an upper limit voltage (operation voltage) which the microcomputer can read. Thus, the deviation between the comparative voltage and the reference voltage can be accurately computed, so that the computation accuracy of the fuel pressure and the fuel temperature can be improved.

(7) The switching command signal and the adjust voltage signal are transmitted from the ECU 30 to the sensor unit 20 through the communication line 15*b*, and the detection signal is transmitted from the sensor unit 20 to the ECU 30 through the signal line 15*c*. Further, the detection signal is transmitted in a form of analog signal through the signal line 15*c*. Thus, the transmission speed of the detection signal can be made high compared with the case where the detection signal is transmitted in a form of bit string through the communication line 15*b*.

(8) Since the changeover switch 27 switches between the pressure detection signal, the temperature detection signal, and the comparative voltage signal according to the switching command signal, these signals can be transmitted through one signal line 15*c*. Thus, the number of the signal line 15*c* can be reduced compared with the case where the separate signal lines are provided for each signal.

(9) A variation in the fuel injection rate is estimated based on a variation in the fuel pressure. Thus, it is required to obtain the variation in the fuel pressure during a fuel injection period. According to the present embodiment, since the comparative voltage signal is transmitted at a time when no fuel is injected, the variation in the fuel pressure can be obtained during the fuel injection period.

Second Embodiment

In the above first embodiment, the first voltage transform circuit 26*a* adjusts the applied-voltage to the reference voltage based on the deviation between the comparative voltage and the reference voltage, so that the deviation between the detected fuel pressure or fuel temperature and the actual fuel pressure or fuel temperature is decreased. According to the second embodiment, the detection signal is corrected based on the deviation between the comparative voltage and the reference voltage before the above computation.

Figure 6:
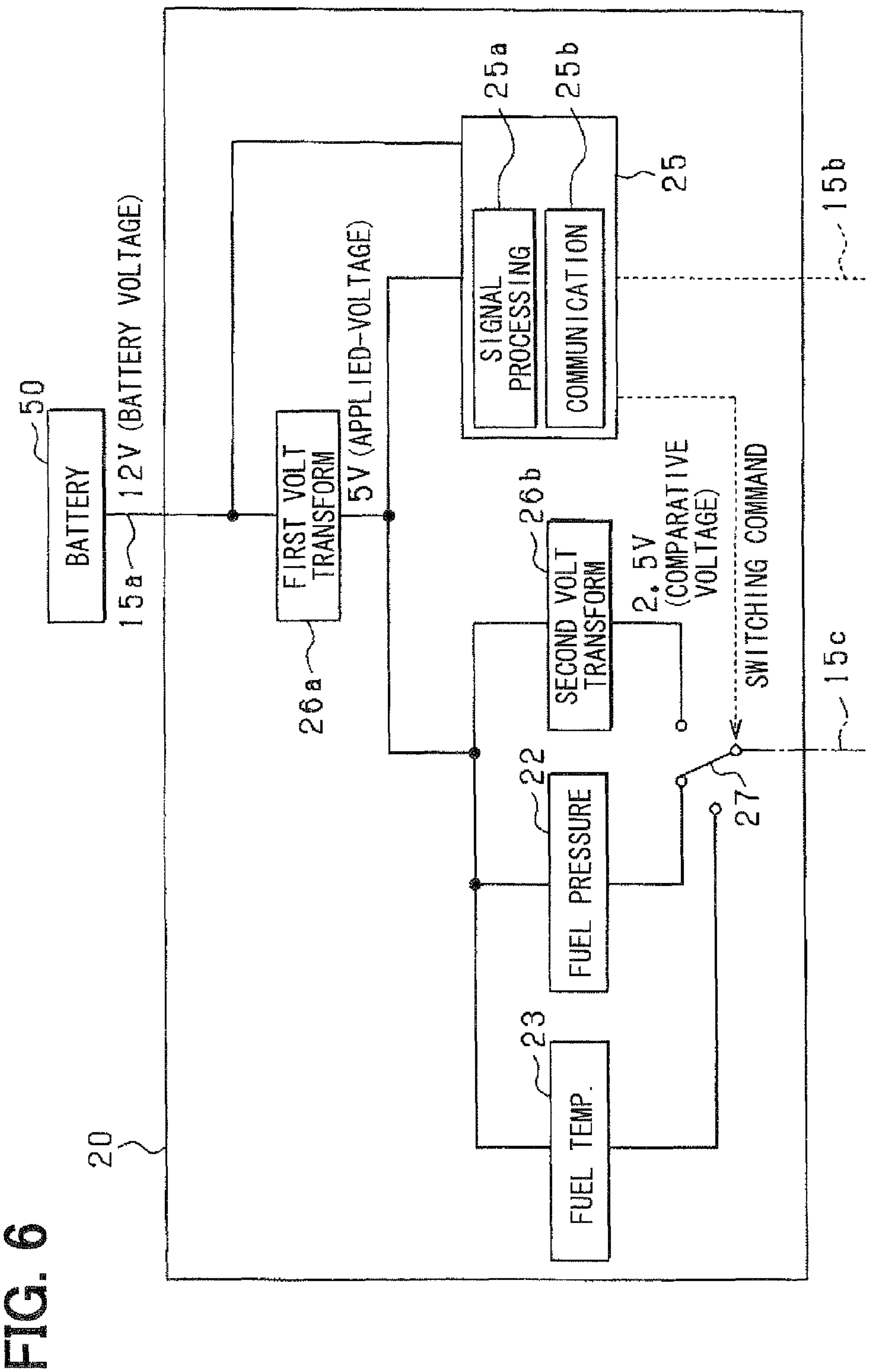
FIG. 6 is a chart showing a circuit configuration of a sensor unit according to a second embodiment.
Figure 7:
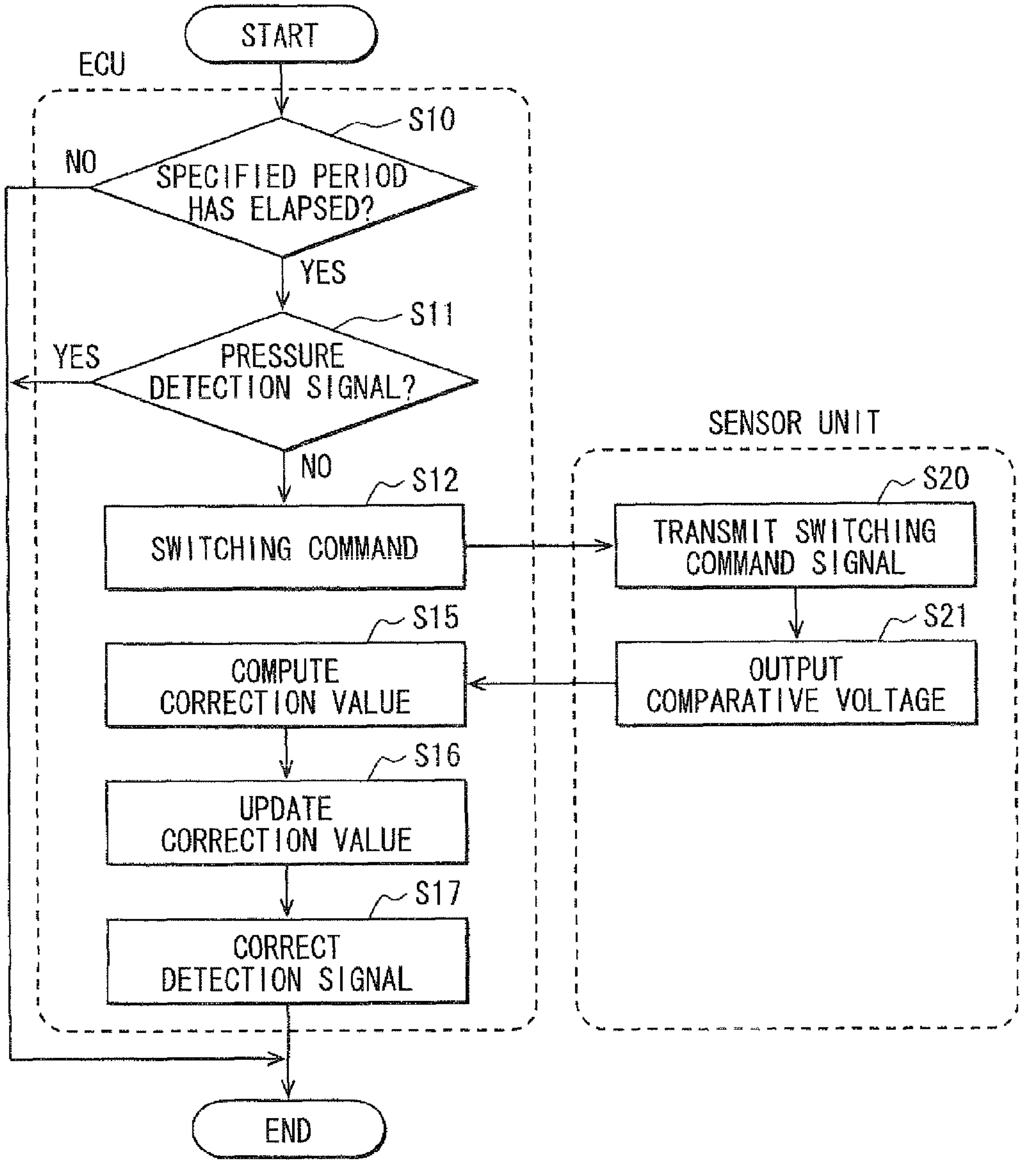
FIG. 7 is a flowchart showing a processing in which a detection signal is corrected by the sensor unit and the ECU shown in FIG. 6.

Referring to FIGS. 6 and 7, the second embodiment will be described in detail, hereinafter.

The ECU 30 has a memory in which the correction value of the detection signal is stored. As shown in FIG. 6, the IC-chip 25 has no memory and the first voltage transform circuit 26*a* does not vary the adjust voltage.

Referring to FIG. 7, a computation procedure of the fuel pressure and the fuel temperature will be described. The processes in steps S10, S11, S12, S20 and S21 are the same as the first embodiment. The ECU 30 computes a correction value of the detection signal based on the comparative voltage transmitted from the sensor unit 20 in step S15.

Specifically, the microcomputer 31 of the ECU 30 computes an actual applied-voltage based on the transmitted comparative voltage. This computing method is the same as the first embodiment. Then, the microcomputer 31 computes a deviation between the applied-voltage and the reference voltage, and computes a correction value with which the voltage values of the pressure detection signal and the temperature detection signal are corrected to compensate the deviation. For example, in a case that the applied-voltage is larger than the reference voltage by 0.1V (deviation=0.1V), 0.1V is subtracted from the voltage values of the detection signals.

It should be noted that the microcomputer 31 corresponds to an obtaining means for obtaining a comparative voltage, a deviation computing means for computing the deviation, and a correction value computing means for computing a correction value.

Then, the computed correction value and the fuel temperature are stored in a memory of the ECU 30. The memory of the ECU 30 is a nonvolatile memory (for example, EEPROM). The correction value stored in the memory is timely updated as a learning value in step S16.

In step S17, the microcomputer 31 computes the fuel pressure or the fuel temperature based on the corrected detection signal.

According to the second embodiment, following advantages can be obtained besides the above advantages (6)-(9) of the first embodiment.

(1') Even if the applied-voltage applied to each detection circuit 22, 23 deviates from the original voltage (reference voltage), the detection signal is corrected in accordance with the deviation. Thus, it is restricted that the computed fuel pressure and the fuel temperature deviate from the actual fuel pressure and the actual fuel temperature, whereby a computation accuracy of the fuel pressure and the fuel temperature can be improved.

(3') Since a detection signal is corrected based on the comparison with the common reference voltage in each sensor unit 20, the deviation amount between the reference voltage and the applied-voltage becomes the same among each sensor unit 20 even if the reference voltage deviates from the original voltage. Thus, it can be avoided that the detection error of the fuel pressure and the fuel temperature disperses with respect to each sensor unit 20.

(4') Since the correction value is associated with the fuel temperature to be stored in the memory and the detection signal is corrected with the correction value which corresponds to the present fuel temperature, the detection signal is corrected in consideration of a temperature characteristic of the fuel pressure detection circuit 22, whereby the computation accuracy of the fuel pressure is further improved.

(5') Since the fuel temperature is detected by the fuel temperature detection circuit 23 provided to the fuel injector 10, the detection signal can be corrected by using of the temperature detected at a vicinity of the fuel pressure detection circuit 22, whereby the temperature characteristic of the fuel pressure detection circuit 22 is accurately considered on the correction value.

Other Embodiment

The present invention is not limited to the embodiments described above, but may be performed, for example, in the following manner. Further, the characteristic configuration of each embodiment can be combined.

- An average voltage of the applied-voltage and the operation voltage can be used as the reference voltage. According to this, even if the operation voltage deviates from the original voltage, it can be avoided that the reference voltage largely deviates from the applied-voltage.
- Also, an average of the comparative voltage of each sensor unit 20 can be used as the reference voltage. Alternatively, an average of the average comparative voltage and the operation voltage can be used as the reference voltage.
- When the comparative voltage signals are transmitted to the ECU 30 through the signal line 15*c* during a specified period, a plurality of comparative voltage values are sampled and averaged. This average value may be used as the reference voltage.
- An average of the previously transmitted comparative voltage and the presently transmitted comparative voltage may be used as the reference voltage.
- The second voltage transform circuit 26*b* may be removed and the applied-voltage can be used as the comparative voltage.
- The processings shown in FIGS. 5 and 7 are executed at specified regular intervals. Alternatively, these processings may be executed every when one fuel injection is performed or every when a specified number of fuel injections are performed. It is preferable that the pressure detection signals are outputted during the fuel injection and a switching from the pressure detection signal to the temperature detection signal is prohibited during the fuel injection.
- If at least one of the comparative voltage signal and the detection signal is out of a normal range, it is notified that the corresponding sensor unit 20 is faulty.
- In the embodiment shown in FIG. 3A, one end of the communication line 15*b* of each sensor unit 20 is connected to a respective communication port 30*b* of the ECU 30.
- In the embodiment shown in FIG. 3B, two communication lines 15*b* are connected to one communication port 30*b*, whereby the number of the communication port 30*b* of the ECU 30 can be reduced.

The same switching command signal is transmitted to each two sensor units 20 through the communication line 15*b*. In this case, it is preferable that the update learning of the adjust voltage or the correction value is performed at the same timing.

Alternatively, different switching command signals can be respectively transmitted to the sensor units 20 even if the sensor units 20 are connected to the same communication line 15*b*.

What is claimed is:

1. A detecting device for a fuel injector, comprising:

a sensor unit having a detection circuit which outputs a detection signal in response to a detection physical quantity representing a fuel pressure or a fuel temperature, the sensor unit provided to a fuel injector for an internal combustion engine; and a computing unit computing the detection physical quantity based on a voltage value of the detection signal relative to a reference voltage;

wherein the computing unit includes a deviation computing means for computing a deviation between the reference voltage and a comparative voltage which represents an applied-voltage applied to the detection circuit, the sensor unit includes an applied-voltage adjusting means for adjusting the applied-voltage in such a manner that the computed deviation becomes smaller, the sensor unit includes a voltage transform circuit in parallel with the detection, and the voltage transform circuit generates the comparative voltage by decreasing the applied-voltage.

2. A detecting device for a fuel injector according to claim 1, wherein the detection circuit is a fuel pressure detection circuit which outputs the detection signal in response to a fuel pressure, the computing unit computes the fuel pressure based on the detection signal outputted from the fuel pressure detection circuit, the computing unit includes an adjust voltage computing means for computing an adjust voltage relative to the applied-voltage based on said deviation, the sensor unit includes a memory means for storing the adjust voltage in association with a fuel temperature, and the applied-voltage adjusting means adjusts the applied-voltage based on the adjust voltage stored in the memory means.

3. A detecting device for a fuel injector according to claim 2, wherein the sensor unit further includes a fuel temperature detection circuit which outputs the detection signal in response to a fuel temperature, the computing unit computes the fuel temperature based on the detection signal outputted from the fuel temperature detection circuit in addition to the fuel pressure, and the adjust voltage is associated with the fuel temperature computed by the computing unit.

4. A detecting device for a fuel injector according to claim 1, further comprising:

a signal line through which the detection signal is transmitted from the sensor unit to the computing unit, wherein the sensor unit includes a switch means for switching between a detection signal outputting condition in which the detection circuit is electrically connected to the signal line and a comparative voltage outputting condition in which the voltage transform circuit is electrically connected to the signal line.

5. A detecting device for a fuel injector according to claim 4, wherein the switch means switches the detection signal outputting condition into the comparative voltage outputting condition when the fuel injector injects no fuel.

6. A detecting device for a fuel injector according to claim 5, wherein the switch means switches the detection signal outputting condition into the comparative voltage outputting condition at every specified combustion cycle or every specified time.

7. A detecting device for a fuel injector according to claim 1, wherein the reference voltage is an operation voltage at which a microcomputer of the computing unit is operated.

8. A detecting device for a fuel injector according to claim 1, wherein the reference voltage is an average of an operation voltage at which a microcomputer of the computing unit is operated and the applied-voltage.

9. A detecting device for a fuel injector according to claim 1, wherein the deviation computing means computes the deviation based on an average of a plurality of comparative voltage which are respectively obtained at different timings.

10. A detecting device for a fuel injector according to claim 1, wherein when at least one of the comparative voltage and the detection voltage is out of a normal range, it is determined that the sensor unit is faulty.

11. A detecting device for a fuel injector, comprising:

a sensor unit having a detection circuit which outputs a detection signal in response to a detection physical quantity representing a fuel pressure or a fuel temperature, the sensor unit provided to a fuel injector for an internal combustion engine; and a computing unit computing the detection physical quantity based on a voltage value of the detection signal relative to a reference voltage; wherein the computing unit includes a deviation computing means for computing a deviation between the reference voltage and a comparative voltage which represents an applied-voltage applied to the detection circuit, and the computing unit computes the detection physical quantity based on the computed deviation, the sensor unit includes a voltage transform circuit in parallel with the detection circuit, and the voltage transform circuit generates the comparative voltage by decreasing the applied-voltage.

12. A detecting device for a fuel injector according to claim 11, wherein the detection circuit is a fuel pressure detection circuit which outputs the detection signal in response to a fuel pressure, the computing unit computes the fuel pressure based on the detection signal outputted from the fuel pressure detection circuit, the computing unit includes a correction value computing means for computing a correction value with which a voltage value of the detection signal is corrected, the computing unit includes a memory means for storing the correction value in association with a fuel temperature, and the computing unit computes the fuel pressure by using of the correction value stored in the memory means.

13. A detecting device for a fuel injector according to claim 12, wherein the sensor unit further includes a fuel temperature detection circuit which outputs the detection signal in response to a fuel temperature, the computing unit computes the fuel temperature based on the detection signal outputted from the fuel temperature detection circuit in addition to the fuel pressure, and the correction value is associated with the fuel temperature computed by the computing unit.

14. A method of operating a detecting device for a fuel injector, the method comprising:

providing a sensor unit to a fuel injector for an internal combustion engine, the sensor unit having a detection circuit which outputs a detection signal in response to a detection physical quantity representing a fuel pressure or a fuel temperature, and the sensor unit including a voltage transform circuit in parallel with the detection circuit;

computing, using a processing system including at least one computer processor, the detection physical quantity based on a voltage value of the detection signal relative to a reference voltage;

computing a deviation between the reference voltage and a comparative voltage which represents an applied-voltage applied to the detection circuit;

adjusting the applied-voltage in such a manner that the computed deviation becomes smaller; and generating, by the voltage transform circuit, the comparative voltage by decreasing the applied-voltage.

15. The method according to claim 14, wherein the reference voltage is an operation voltage at which the computer processor is operated.

16. The method according to claim 14, wherein the reference voltage is an average of an operation voltage at which the computer processor is operated and the applied-voltage.

17. The method according to claim 14, wherein the deviation is computed based on an average of a plurality of comparative voltage which are respectively obtained at different timings.

18. The method according to claim 14, further comprising determining that the sensor unit is faulty when at least one of the comparative voltage or the detection voltage is out of a normal range.

19. A method of operating a detecting device for a fuel injector, the method comprising:

providing a sensor unit to a fuel injector for an internal combustion engine, the sensor unit having a detection circuit which outputs a detection signal in response to a detection physical quantity representing a fuel pressure or a fuel temperature, and the sensor unit including a voltage transform circuit in parallel with the detection circuit;

computing, using a processing system including at least one computer processor, the detection physical quantity based on a voltage value of the detection signal relative to a reference voltage;

computing a deviation between the reference voltage and a comparative voltage which represents an applied-voltage applied to the detection circuit;

computing the detection physical quantity based one of the computed deviation; and generating, by the voltage transform circuit, the comparative voltage by decreasing the applied-voltage.

* * * * *